Dec. 30, 1947.                    L. A. MARCH                    2,433,671
                COMPOSITE CONDUCTOR FOR DYNAMOELECTRIC MACHINES
                              Filed June 24, 1944
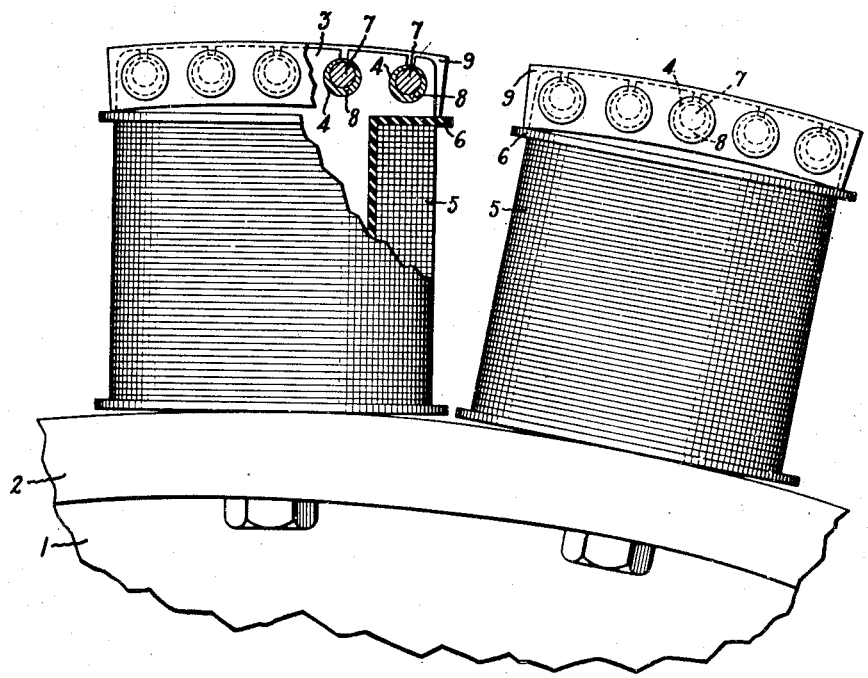
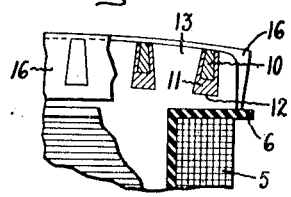
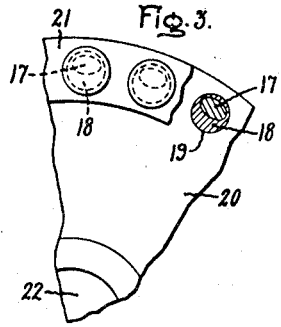
Inventor:
Laurel A. March,
by Harry E. Dunham
His Attorney.

Patented Dec. 30, 1947

2,433,671

UNITED STATES PATENT OFFICE 2,433,671

COMPOSITE CONDUCTOR FOR DYNAMO-ELECTRIC MACHINES

Laurel A. March, Fort Wayne, Ind., assignor to General Electric Company, a corporation of New York Application June 24, 1944, Serial No. 541,863

6 Claims. (Cl. 172—120)

My invention relates to dynamoelectric machines and more particularly to an improved double resistance winding for such machines.

An object of my invention is to provide an improved double resistance winding for a dynamoelectric machine.

Another object of my invention is to provide an improved dynamoelectric machine having a damping winding formed of composite conductors.

A further object of my invention is to provide an improved composite conductor.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a fragmentary view of a dynamoelectric machine showing pole pieces, one of which is partly broken away, incorporating an embodiment of my invention; Fig. 2 is a fragmentary sectional view of a modification of the pole face winding shown in Fig. 1; and Fig. 3 is a fragmentary view of another modification of my invention applied to an induction motor rotor.

Referring to the drawing, I have shown in Fig. 1 a rotatable member for a dynamoelectric machine of the synchronous alternating current type provided with a rotatable member having a supporting web 1 adapted to be mounted on a suitable shaft and provided with a circumferentially extending flange 2 of magnetic material on which a plurality of pole pieces is adapted to be secured. These pole pieces are formed with laminated cores 3 of magnetic material having winding slots 4 formed therein adjacent the outer ends of the pole pieces, and a field exciting winding 5 is arranged about each pole piece and insulated therefrom by a suitable insulating element 6. An amortisseur winding of the squirrel cage type, which is adapted to function as a starting and damping winding for the machine, is arranged in the winding slots 4 and includes a plurality of my improved double resistance winding composite conductors. These conductors are formed with an inner cylindrical core portion 7, preferably of ferrous material, and having a relatively high resistance, and with an outer cylindrical layer 8 of relatively low resistance electrically conductive material arranged about and intimately bonded to the outer surface of the conductor core 7. The outer portion 8 of the composite conductors may be made of any suitable material, such as copper or brass, and its dimensions relative to the core 7 may be varied to provide the desired resultant electrical resistance to the composite conductors. My improved arrangement provides the same desirable high torque as can be obtained by solid conductors made entirely of such material as brass and, in addition, has the advantage over brass bars in that these conductors are stronger, less expensive, and are made largely of material which is relatively more abundant. In order to increase both the starting torque and the running torque near synchronous speed, the conductor core 7 is displaced eccentrically to one side of the center of the copper part 8 of the conductor with the conductors arranged in the winding slots with the core 7 adjacent the outer periphery of the winding. In some instances where ferrous material is used, it may be desirable that it be non-magnetic, although a magnetic material core provides an arrangement in which the reactance of the winding may easily be varied for different machines using the same core structure. This provides a winding having a relatively high resistance outer conductor portion and a relatively low resistance inner conductor portion similar to a double squirrel cage winding with the inherent advantages of this type winding but formed by a single conductor. The ends of these conductors are electrically connected together by a short-circuiting end conductor 9 to form a closed squirrel cage winding and are secured to this end conductor by extending through openings therein and being brazed or welded to this conductor.

Fig. 2 illustrates a modification of the pole face slot construction for the amortisseur winding in which the conductors are formed of trapezoidal sections with a trapezoidal core 10, preferably of ferrous material, having a relatively high resistance and with a trapezoidal outer layer 11 of relative low resistance material, such as copper, arranged around at least a part of the core 10 and intimately bonded thereto. As in the other arrangement, the core 10 is displaced toward one side of the center of each conductor and adjacent the outer side of winding slot 12 in the pole core 13. This provides the advantages of the composite conductor shown in Fig. 1 and, in addition, permits the use of a conductor having a smaller width near the outside than at the inside, thereby providing for a further increase in the resistance of the outer portion of the conductor over the inner conductor portion. The ends of these composite conductors are connected together by short-circuiting end rings 16 to complete the squirrel cage winding, similar to Fig. 1, and are fitted into trapezoidal openings in these end rings and brazed or welded thereto.

Fig. 3 shows a further modification of my invention applied to a squirrel cage winding of an induction motor rotor. In this arrangement, the composite conductors are formed of an elliptical section core 17 of ferrous material having a relatively high resistance, and the outer portion of the core 18 is formed of a relatively low resistance material, such as copper, having a substantially cylindrical outer surface. This copper portion 18 is arranged about the core 17 and is intimately bonded thereto with the core 17 displaced eccentrically to one side of the center of the conductor and arranged in the winding slots 19 of a laminated inductor motor magnetic material core 20, with the core 17 toward the outside of the winding slot 19 and adjacent the periphery of the core 20. In this manner, the single composite conductor has the characteristics of a double squirrel cage winding in that the outer portion of the conductor has a relatively high resistance and the inner portion of the conductor has a relatively low resistance. The elliptical section of the core 17 increases this relationship by providing a smaller low resistance conductor section adjacent the outer side of the conductors and a larger low resistance conductor adjacent the inner side of the conductors. As in a conventional squirrel cage induction motor rotor, the ends of the conductors are electrically connected together by short-circuiting end rings 21 to which the conductors are secured by being riveted thereto, or by providing a welded or brazed joint therebetween. As in a conventional rotor, the core 20 is mounted on a suitable shaft 22.

While I have illustrated and described two particular embodiments in the form of squirrel cage damping windings and one embodiment as a squirrel cage induction motor rotor winding, any of the constructions can be used for any application of cage windings, and modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having a core of magnetic material with winding slots therein, a winding including conductors in said slots formed of a core of relatively high resistance material with an outer sleeve of relatively low resistance electrically conductive material enclosing the outer surface of said conductor core to provide the desired resultant electrical resistance to said conductors, said conductor core being displaced toward one side of said conductor adjacent the outer side of said winding slots for providing a higher resistance outer conductor portion and a relatively lower resistance inner conductor portion, and means for electrically connecting together said conductors to complete said winding.

2. A dynamoelectric machine having a core of magnetic material with winding slots therein, a winding including conductors in said slots formed of a core of relatively high resistance material with an outer sleeve layer of copper enclosing said core and intimately bonded to the outer surface thereof to provide the desired resultant electrical resistance to said conductors, said conductor core being displaced toward one side of the center of said conductor adjacent the outer side of said winding slots for providing a higher resistance outer conductor portion and a relatively lower resistance inner conductor portion, and means for electrically connecting together said conductors to complete said winding.

3. A dynamoelectric machine having a core of magnetic material with winding slots therein, a winding including conductors in said slots formed of a cylindrical core of relatively high resistance material with a cylindrical outer layer relatively low resistance electrically conductive material arranged about the outer surface of said conductor core to provide the desired resultant electrical resistance to said conductors, said conductor core being displaced eccentrically relative to said outer layer and arranged adjacent the outer side of said winding slots for providing a higher resistance outer conductor portion and a relatively lower resistance inner conductor portion, and means for electrically connecting together said conductors to complete said winding.

4. A dynamoelectric machine having pole pieces of magnetic material with winding slots therein adjacent the outer ends of said pole pieces, a damping winding including conductors in said slots formed of a core of relatively high resistance material with an outer sleeve layer of copper enclosing said core and intimately bonded to the outer surface thereof to provide the desired resultant electrical resistance to said conductors, said conductor core being displaced toward one side of said conductor adjacent the outer side of said winding slots for providing a higher resistance outer conductor portion and a relatively lower resistance inner conductor portion, and means for electrically connecting together said conductors to complete said winding.

5. A damping winding for a dynamoelectric machine including conductors formed of an electrically conductive core of relatively high resistance material with an outer sleeve of relatively low resistance electrically conductive material enclosing said core and intimately bonded to the outer surface thereof to provide the desired resultant electrical resistance to said conductors, said conductor core being displaced in said conductor toward one side of the center adjacent the outer periphery of said winding for providing a relatively high resistance outer conductor portion and a relatively lower resistance inner conductor portion, and means for electrically connecting together said conductors to complete said winding.

6. A composite electrical conductor formed of an electrically conductive core of relatively high resistance material with an outer sleeve of relatively low resistance electrically conductive material enclosing said core and intimately bonded to the outer surface thereof to provide the desired resultant electrical resistance to said conductors, said conductor core being displaced in said conductor toward one side of the center for providing a relatively high resistance conductor portion adjacent one side of said conductor and a relatively lower resistance conductor portion adjacent the opposite side of said conductor.

LAUREL A. MARCH.

REFERENCES CITED

The following references are of record in the file of this patent:

UNITED STATES PATENTS

| Number | Name | Date |
|---|---|---|
| 1,275,687 | Hodgson | Aug. 13, 1918 |
| 1,375,461 | Kimble | Apr. 19, 1921 |
| 1,508,152 | Alger | Sept. 9, 1924 |
| 1,695,391 | Schon | Dec. 18, 1928 |
| 1,740,599 | Johnson | Dec. 24, 1929 |
| 1,839,078 | Alger | Dec. 29, 1931 |

FOREIGN PATENTS

| Number | Country | Date |
|---|---|---|
| 660,854 | France | Feb. 26, 1929 |
| 391,971 | Germany | Mar. 14, 1924 |
| 392,098 | Germany | Mar. 19, 1924 |